Aug. 12, 1952   R. D. TRACEY   2,606,744
TRAILER TONGUE WITH LIFTING MEANS

Filed May 23, 1950   2 SHEETS—SHEET 1

INVENTOR.
Richard D. Tracey
BY Harold E. Cole
Attorney

Aug. 12, 1952     R. D. TRACEY     2,606,744
TRAILER TONGUE WITH LIFTING MEANS
Filed May 23, 1950     2 SHEETS—SHEET 2

INVENTOR.
Richard D. Tracey
BY Harold E. Cole
Attorney

Patented Aug. 12, 1952

2,606,744

UNITED STATES PATENT OFFICE 2,606,744

TRAILER TONGUE WITH LIFTING MEANS

Richard D. Tracey, Lexington, Mass.

Application May 23, 1950, Serial No. 163,620

7 Claims. (Cl. 254—86)

This invention relates to a trailer tongue construction with lifting means.

One object of my invention is to provide a lifting means carried by a trailer tongue the leg of which is lowered into lifting position in a vertically downward movement by power means, and upon release, is automatically retracted by a direct upward movement.

A further object is to so construct said lifting means that it takes a relatively small space and has so few parts that it performs its lifting function by such simple movements that there is almost no likelihood of its failing to operate.

The foregoing and other objects which will appear as the nature of the invention is better understood, may be accomplished by a construction combination and operative arrangement of parts such as is disclosed by the drawings. The nature of the invention is such as to render it susceptible to various changes and modifications, and therefore, I am not to be limited to the construction disclosed by the drawings nor to the particular parts described in the specification; but am entitled to all such changes therefrom as fall within the scope of my claims.

Figure 1:
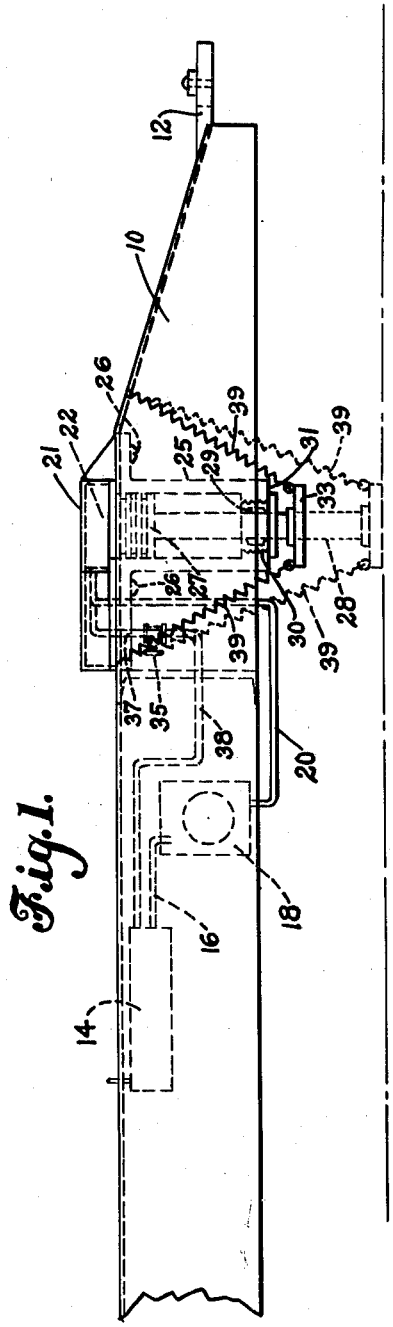
Figure 1 is a side elevational view of a trailer tongue, shown broken away, with my lifting means mounted thereon, the dash lines indicating the position of the lifting leg of the jack and retracting springs when the tongue is held in raised position thereby.
Figure 2:
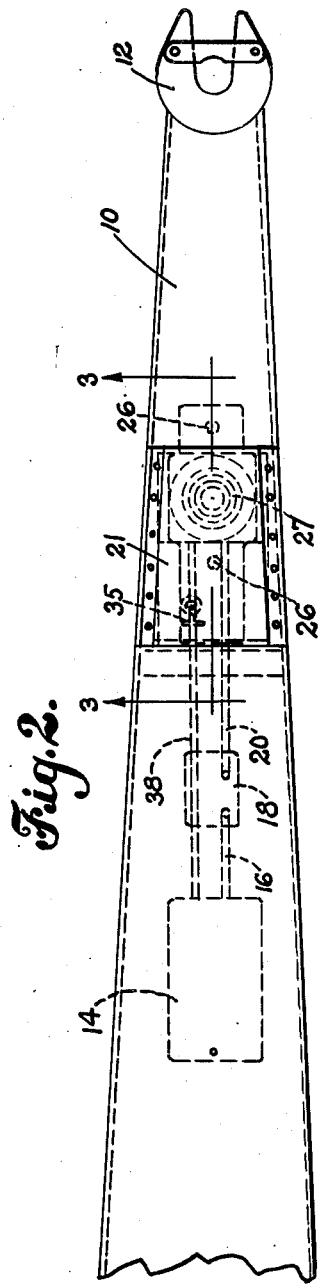
Figure 2 is a top plan view thereof.
Figure 3:
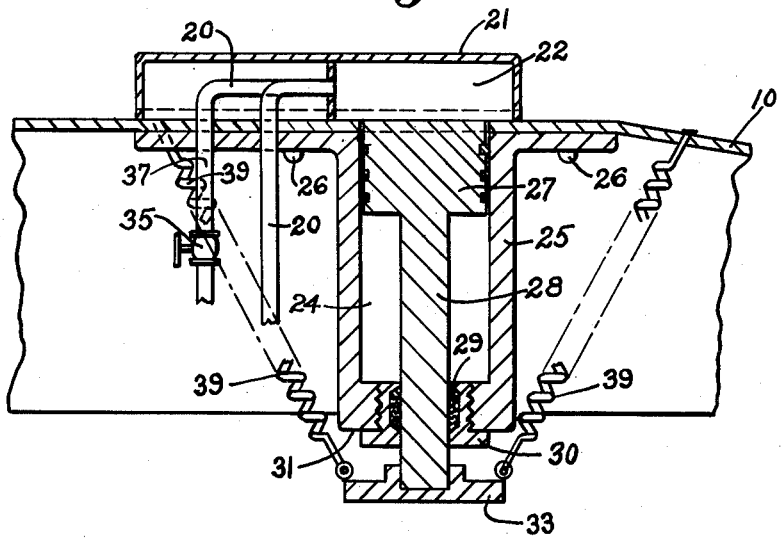
Figure 3 is a sectional view, enlarged, taken on the line 3—3 of Figure 2.

As illustrated, a hollow trailer tongue 10 forms the forward end of a trailer unit which is adapted to connect, by means of said connector member 12 at its front end, with a tractor or truck, not shown. An oil reservoir 14 is supported by said tongue 10 from which a conduit 16 extends to a well known injection piston pump 18 of a type used with hydraulic jacks and operated by a battery or any well known source of power.

A conduit 20 extends from said pump 18 to the upper part of a raised portion 21 of said tongue and communicates with fluid accumulating passage 22 formed in said tongue and preferably partly enclosed by said raised portion. This fluid passage 22 is directly above and in communication with a space 24 provided in a housing 25 of a lifting jack, as shown in said Fig. 1. This housing 25 is bolted as at 26 to said tongue 10. Movable in said space 24 is the usual head or packing member 27 in said housing which commonly includes a plurality of washers and which forms the head of a lifting leg 28 of said jack that is movable vertically in said housing 25. Part of said leg 28 normally extends through packing 29 in a stuffing box 30 and outside the bottom 31 of said housing, where it terminates in a base 33.

When the jack is retracted, said jack head 27 extends only partly into said fluid passage 22, so the oil or other fluid can flow into a space above it. Thus said leg 28 is forced directly downward when the pressure of oil or other liquid on said head or packing member 26 is sufficient to accomplish this. This carries said base 33 to the ground or other traveled surface, as shown in the broken lines in Figure 1 of the drawings, thereby supporting said tongue 10 above the surface, at any desired height, by the jack.

When the jack is about to be raised a valve 35 is closed, which is in a return conduit 37 that extends from said indirect passage portion 22. Closing of said valve 35 assures the maintenance of liquid pressure on said lifting leg 28 thus raising and keeping the said tongue 10 in raised position. Another return conduit 38 extends to said reservoir 14 from said valve.

Attached to said base 33 and to said tongue 10 are two spiral springs 39 which hold said leg 28 in retracted or normal position; but which are distorted by stretching when hydraulic pressure is applied to said leg 28. These springs 39 are under considerable tension when said tongue 10 is jacked up by said leg 28, as in the position shown by the dash lines in said Figure 1, hence when said valve 35 is opened and the fluid flows to said reservoir 14, said springs 39 automatically draw said leg 23 to retracted or normal position.

To raise said tongue 10 it is only necessary to operate said pump, first closing said valve 35, whereupon the oil from said reservoir 14 flows to said passage 22 and space 24 and forces said leg 28 downwardly to the desired position, whereupon said valve 35 is closed and the pump stopped.

What I claim is:

1. A trailer tongue embodying a hollow portion, a reservoir for liquid and a pump supported by said tongue, a portion of said tongue having a fluid accumulating passage therein, a lifting jack below said passage and supported by said tongue and embodying a housing in communication with said passage, a leg movably mounted in said housing and extending below it and said tongue, spring means attached to said tongue and to said leg and adapted to retract said leg to normal position when fluid pressure is released, conduit means in communication with said reservoir and said pump and said passage, and other conduit means in communication with said passage and said reservoir and embodying a valve whereby the flow of liquid from said passage to said reservoir may be controlled or discontinued.

2. A trailer tongue embodying a hollow portion, a reservoir for liquid and a pump supported by said tongue, said tongue having a hollow raised portion having a fluid accumulating passage therein, a lifting jack below said passage and supported by said tongue and embodying a housing within said hollow portion, and a leg movably mounted in said housing and extending outside of it, two springs attached to said tongue and to said leg and adapted to retract said leg to normal position when pressure is released, conduit means in communication with said reservoir and said pump and extending into the space in said raised portion and communicating with the upper portion of said passage, and other conduit means extending into the space in said raised portion and in communication with said passage and said reservoir and embodying a valve whereby the flow of liquid from said passage to said reservoir may be controlled or discontinued.

3. A trailer tongue embodying a hollow portion, a lifting jack supported by said tongue, said jack embodying a housing, a lifting leg movably mounted in said housing and extending below it and said tongue, said hollow portion having a fluid accumulating passage above said housing and in communication with it, said fluid passage tongue portion having provision whereby it is adapted to communicate with a fluid supply conduit and with a fluid return conduit.

4. A trailer tongue embodying a hollow portion, a lifting jack supported by said hollow portion and embodying a housing, a lifting leg movably mounted in said housing and embodying a base normally outside said housing and trailer tongue, said hollow portion having a fluid accumulating passage above said housing and in communication with it, said fluid passage tongue portion having provision whereby it is adapted to communicate with a fluid supply conduit and with a fluid return conduit.

5. A trailer tongue comprising a hollow portion, embodying a raised portion having a fluid accumulating passage therein, a lifting jack supported by said tongue and embodying a housing in communication with said fluid passage, a lifting leg movably mounted in said housing below said fluid passage and extending below said housing and said tongue, said raised portion having provision whereby it is adapted to communicate with a fluid supply conduit and with a fluid return conduit.

6. A trailer tongue comprising a hollow portion embodying a raised portion at the top part thereof having a fluid accumulating passage therein, a lifting jack supported by said tongue and embodying a housing attached to said tongue and in communication with said fluid passage, a lifting leg movably mounted in said housing below said fluid passage extending below said housing and said tongue and embodying a base also below said housing and said tongue, and two springs attached to said base and extending outside said housing and attached to said tongue adapted to retract said leg to normal position when pressure upon said leg is released.

7. A trailer tongue embodying a hollow portion, a lifting jack supported by said tongue, said jack embodying a housing, a lifting leg movably mounted in said housing and extending below it and said tongue, said hollow portion having a fluid accumulating passage above said housing and in communication with it, said fluid passage tongue portion having provision whereby it is adapted to communicate with a fluid supply conduit and with a fluid return conduit, and two springs attached to said tongue converging downwardly and attached to said leg at opposite sides of and outside said housing, said springs being adapted to retract said leg to normal position when pressure upon said leg is released.

RICHARD D. TRACEY.

REFERENCES CITED

The following references are of record in the file of this patent:

UNITED STATES PATENTS

| Number | Name | Date |
| --- | --- | --- |
| 836,975 | Johnson | Nov. 27, 1906 |
| 2,383,666 | Martin | Aug. 28, 1945 |
| 2,416,796 | Dobbs | Mar. 4, 1947 |